United States Patent [19]
Prevost et al.

[11] Patent Number: 5,643,469
[45] Date of Patent: Jul. 1, 1997

[54] PROCESS FOR SEPARATING PHASES OF DIFFERENT DENSITIES AND CONDUCTIVITIES BY ELECTROCOALESCENCE AND CENTRIFUGATION

[75] Inventors: Isabelle Prevost, Conflans Sainte Honorine; Alexandre Rojey, Rueil Malmaison, both of France

[73] Assignee: Institut Francais du Petrole, Rueil Malmaison, France

[21] Appl. No.: 464,099

[22] Filed: Jun. 5, 1995

Related U.S. Application Data

[62] Division of Ser. No. 212,762, Mar. 15, 1994.

[30] Foreign Application Priority Data

Mar. 15, 1993 [FR] France ................... 93 03112

[51] Int. Cl.$^6$ ................. B01D 21/26; B03C 5/00
[52] U.S. Cl. ........ 210/787; 210/806; 210/512.1; 204/554; 204/571; 204/573; 204/671
[58] Field of Search ............. 210/512.1, 512.2, 210/512.3, 243, 748, 787, 806, 240; 204/554, 571, 573, 660, 671

[56] References Cited

U.S. PATENT DOCUMENTS 4,066,526  1/1978  Yeh ........................ 204/186
4,116,790  9/1978  Prestridge ................ 204/188
4,204,934  5/1980  Warren et al. ........... 204/186
4,390,426  6/1983  Vicard ...................... 210/243

FOREIGN PATENT DOCUMENTS 1586741  8/1990  U.S.S.R. .

*Primary Examiner*—David A. Reifsnyder
*Attorney, Agent, or Firm*—Antonelli, Terry, Stout & Kraus, LLP

[57] ABSTRACT

Device for separating a mixture consisting of at least a continuous phase (I) and of at least a conducting disperse phase (II) in the form of particles such as drops in the continuous phase, the two phases having different densities. The device includes at least two substantially cylindrical parts (1, 3) fitted into each other which delimit an annular zone (5), introducing means (6, 7) for introducing the mixture to be separated at the periphery of the outer tubular part (1), arranged so as to communicate a rotational motion to the mixture, means for applying between the two parts (1, 3) a potential difference capable of causing the particles of the disperse phase (II) to coalesce, receiving and decanting means (4), means (8, 9) for discharging the two phases (I) and (II) at least partly separated on account of the differentiated motion of the particles which have coalesced and means for establishing a circulation of the mixture.

15 Claims, 6 Drawing Sheets

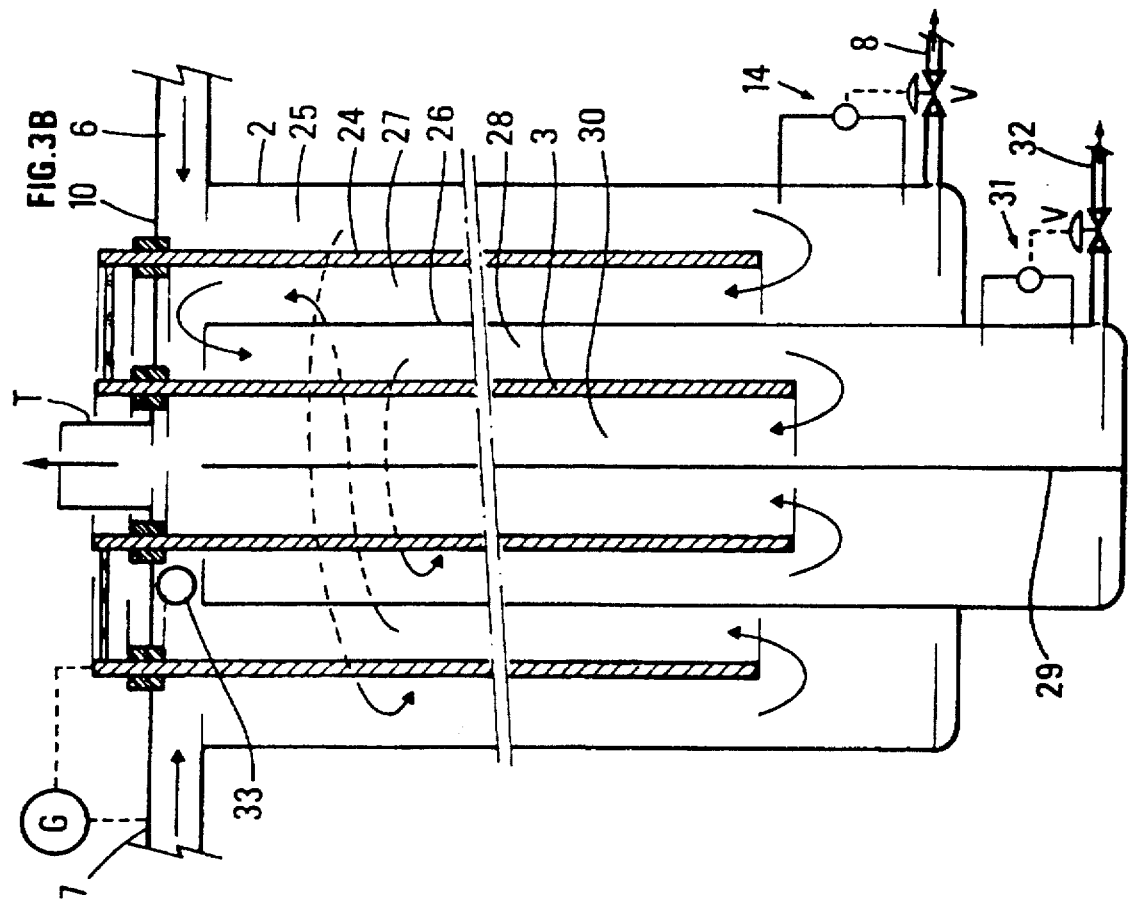
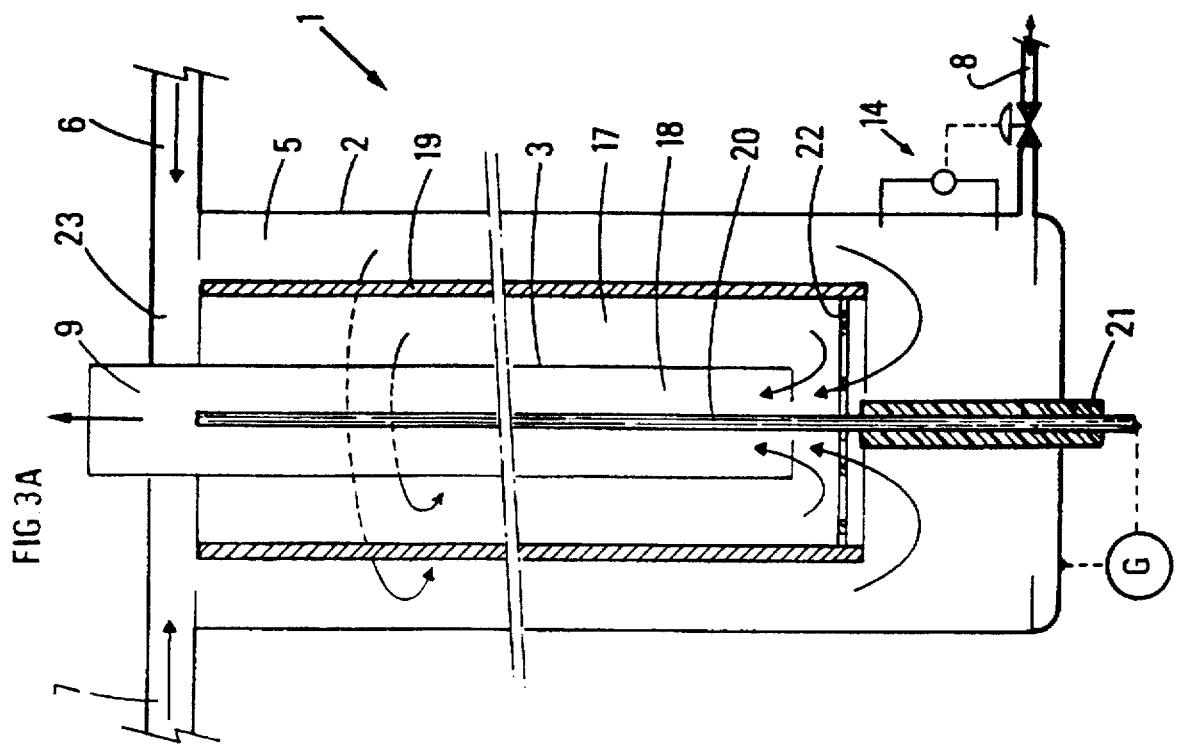

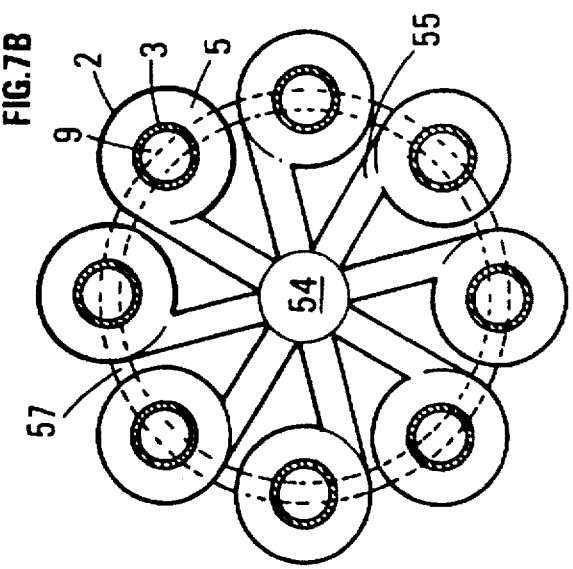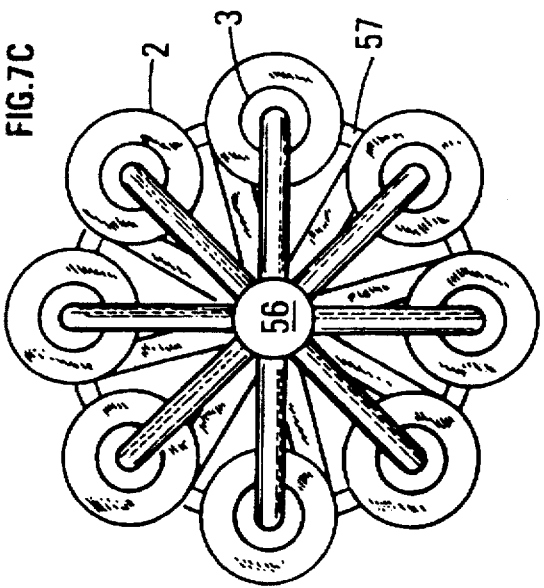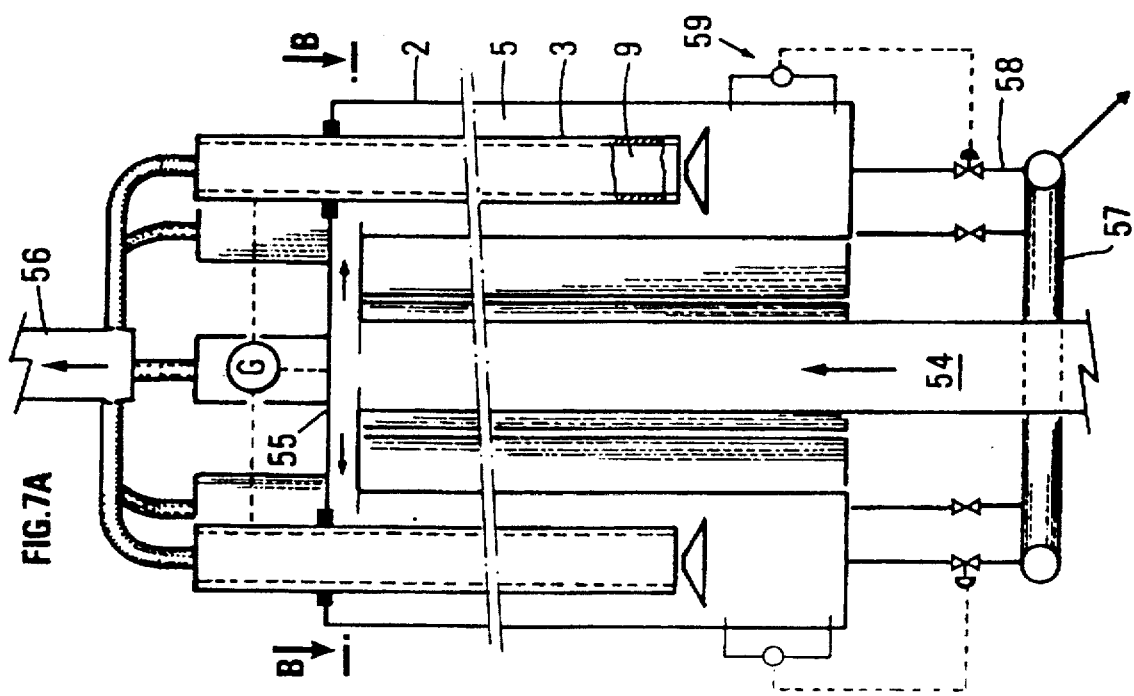

PROCESS FOR SEPARATING PHASES OF DIFFERENT DENSITIES AND CONDUCTIVITIES BY ELECTROCOALESCENCE AND CENTRIFUGATION

This is a division of application Ser. No. 212,762, filed Mar. 15, 1994 pending.

FIELD OF THE INVENTION

The present invention relates to a device and to a process for separating a continuous phase and a conducting disperse phase by electrocoalescence and centrifugation.

The invention is particularly well suited for desalting and dehydrating a petroleum effluent consisting of an aqueous disperse phase in the form of drops and of a continuous organic phase.

The transportation of crude oil under good technical and economic conditions requires the removal, at least partly, of its aqueous phase. In fact, the transportation and the treating of a volume of aqueous phase involves a loss of pumping or heating energy of the units. Furthermore, the aqueous phase being made up of formation water, it consists of a possibly highly salted brine of a variable salinity ranging for example between 10 g/l and 200 g/l. As it goes through transportation, receiving, treating and refining equipments, the aqueous phase may be the origin of salt depositions and of corrosion problems which lead to disturbances in the treating chain and particularly in refining plants. It is therefore increasingly important to have an efficient industrial process for separating the brine from the crude oil.

BACKGROUND OF THE INVENTION

The prior art describes many devices and processes allowing such a separation to be performed.

The most simple technique consists in introducing the mixture to be separated into a chamber whose volume is designed to allow a sufficient residence time for all the drops forming the dispersed phase to have time to gather and coalesce at the separation interface between the two phases.

This technique, which is commonly used, involves very bulky installations and possibly relatively long residence times.

An improvement in this technique consists in heating the chambers containing the mixture so as to increase the rate of sedimentation of the drops and their encounter probability.

Another technique consists in applying an electric field which promotes the coalescence of the drops of a conducting dispersed phase in a relatively little conducting medium.

In the electrostatic separators applying this principle, breakdown phenomena due to an increase in the electric charge between the electrodes may sometimes be observed, for example in case of an alignment of conducting drops in line with the field.

Other electrode and electric field separator technologies are described in U.S. Pat. No. 4,601,834, U.S. Pat. No. 1,592,011, SU-1,568,741.

The separation between two phases may be improved by using the effect of a centrifugal acceleration, as described in patent FR-2,663,238 filed by the applicant, and by promoting the formation of a film of drops which have coalesced on the surface of the inner helical part of the device.

U.S. Pat. No. 4,116,670 describes a device for achieving the coalescence of drops between two electrodes until drops of a determined size are obtained, the separation of the drops being performed in a centrifugal separator located after the zone of the device achieving the coalescence of the drops.

Patent application FR-92/13,360 filed by the applicant describes a device using the combined effects of the electrocoalescence due to the presence of an electric field between two electrodes and of the centrifugal effect resulting from the shape of the electrodes to promote the phase separation.

It has been discovered, and this is the object of the present invention, that it is possible and advantageous to benefit by the simultaneous action of an electric field and of a centrifugal effect for separating a mixture, by using electrodes of a simple shape, the centrifugal effect being due to the tangential introduction of the mixture and to its flowing inside a revolution volume delimited by the electrodes.

In the text hereafter, the term electrode is understood to be a part brought to an electric potential.

SUMMARY OF THE INVENTION

The present invention relates to a process for separating a mixture consisting of at least a continuous phase and at least a conducting disperse phase in the form of particles such as drops in the continuous phase, the two phases having different densities. It is characterized in that the mixture to be separated is introduced into at least one annular zone, said annular zone being delimited by at least two substantially cylindrical parts fitted into each other, by introducing said mixture towards the periphery of at least one of the substantially cylindrical parts, so as to communicate thereto a rotational motion in the annular zone, in that a potential difference is applied between the two substantially cylindrical parts so as to generate a radial electric field in the first annular zone to promote the coalescence of the disperse phase particles and to obtain a separation of the two phases, and in that the two phases, at least partly separated, are collected in a receiving and decanting zone.

The mixture is for example introduced tangentially to the periphery of at least one of the substantially cylindrical parts.

The mixture to be separated may be circulated in a plurality of annular zones located between coaxial tubular electrodes.

The mixture may be injected simultaneously into several annular zones.

The mixture to be separated may also be circulated successively in various annular zones.

The mixture to be separated is for example circulated in the first annular zone delimited by an outer tubular part and an inner tubular part, the two parts being substantially coaxial, where it undergoes a first separation during which the particles that have partly coalesced agglomerate towards the periphery of the outer tubular part, the partly separated continuous phase passing into a second annular zone delimited by the inner tubular part and a central electrode, in a globally opposite direction to the direction of circulation of the mixture in the first zone, the remaining particles coalescing during the circulation of said partly separated phase in the second annular zone and agglomerating on the inner wall of the outer tubular part, the particles which have coalesced on the inner walls of the outer tubular part and of the inner tubular part being drained towards the lower part of the device while the rest of the continuous phase is discharged through the pipe.

The process may comprise several mixture separation steps performed in series, each of these steps allowing a fraction of the disperse phase contained in the form of drops in the original mixture to be separated.

A continuous potential difference is for example applied between the parts or electrodes delimiting an annular zone to generate an electric field.

An alternating potential difference or a periodic-varying potential difference of constant sign may also be applied between the parts or electrodes delimiting an annular zone to generate an electric field.

The peak value of the electric field established within an annular zone may range between $3.10^4$ and $6.10^5$ V/m.

The average velocity of flow of the mixture to be separated in an annular space preferably ranges between 1 and 10 m/s.

The disperse phase particles which have partly coalesced and which leave each annular zone are for example separated from the continuous phase by static centrifugation.

The invention further relates to a device for separating a mixture consisting of at least a continuous phase and at least a conducting disperse phase in the form of particles such as drops in the continuous phase, the two phases having different densities. It includes at least two substantially cylindrical parts fitted into each other and delimiting an annular zone between each other, introducing means for introducing the mixture to be separated at the periphery of at least one of the parts arranged so as to communicate a rotational motion to the mixture, means for applying between the two substantially cylindrical parts a potential difference capable of causing the disperse phase particles to coalesce, receiving and decanting means, means for discharging the two phases at least partly separated on account of the differentiated motion of the particles which have coalesced and means for establishing a circulation of the mixture.

The means for discharging the partly separated continuous phase and conducting disperse phase are located in different places.

The substantially cylindrical parts comprise for example an outer tubular part and an inner part, said parts being coaxial.

The inner part may be a tubular part forming a pipe through which the continuous phase is discharged.

The inner cylindrical electrode is covered with an insulating material such as a polymer.

The device may include a plurality of coaxial parts performing the function of electrodes delimiting a plurality of annular zones and means for applying between any two adjacent electrodes delimiting an annular zone a potential difference capable of causing the drops of the disperse conducting phase to coalesce.

The device may include means for leading in the mixture to be separated in parallel into the annular zones, said means being located on the periphery of each of the annular zones and according to a substantially tangential direction to the periphery of each of the annular zones, and at the same end of the device.

The outlet of an annular zone communicates for example with the inlet of the next adjacent annular zone so that the mixture to be separated runs through the successive annular zones in series, one after the other.

A grid may be arranged close to the inner wall of the inner part so as to stabilize the film consisting of drops which have coalesced on said wall.

The receiving and separating means may comprise a conical part inside which the phase formed by the particles which have coalesced and carried along by the continuous phase is separated by hydrocyclonic centrifugation.

The device may include a means for detecting the interface between the partly separated phases, so as to maintain the interface level between two given values.

The process and the device according to the invention are particularly well suited to the separation of a mixture such as a petroleum effluent containing a disperse aqueous phase as an organic continuous phase and/or to the desalting of crude oil comprising the admixture of relatively little salted water.

One advantage of the present invention is to minimize drop chaining phenomena between two neighbouring or adjacent electrodes since the drops are kept away from one of the two electrodes under the effect of the centrifugal force. Breakdown risks due to the alignment of the drops between two successive electrodes are therefore reduced.

Another advantage is to increase the separation efficiency through the optimum use of the treating volume where the electrocoalescence phenomenon and the centrifugal effect are combined.

BRIEF DESCRIPTION OF THE DRAWINGS

Other features and advantages of the present invention will be clear from reading the description hereafter, with reference to the accompanying drawings in which:

FIG. 7B is a cross-section of the device along the axis B—B of FIG. 7A, and FIG. 7C is a topview of the assembly.

DESCRIPTION OF THE PREFERRED EMBODIMENTS

The device which is described hereafter allows a mixture containing a conducting disperse phase in the form of drops and a continuous phase to be separated by using the combined effects of electrocoalescence and of centrifugation obtained by introducing the mixture tangentially into a separation chamber, so that the disperse phase drops which have coalesced gather towards the chamber periphery, which leads to an at least partial separation of the two phases.

Figure 1A:
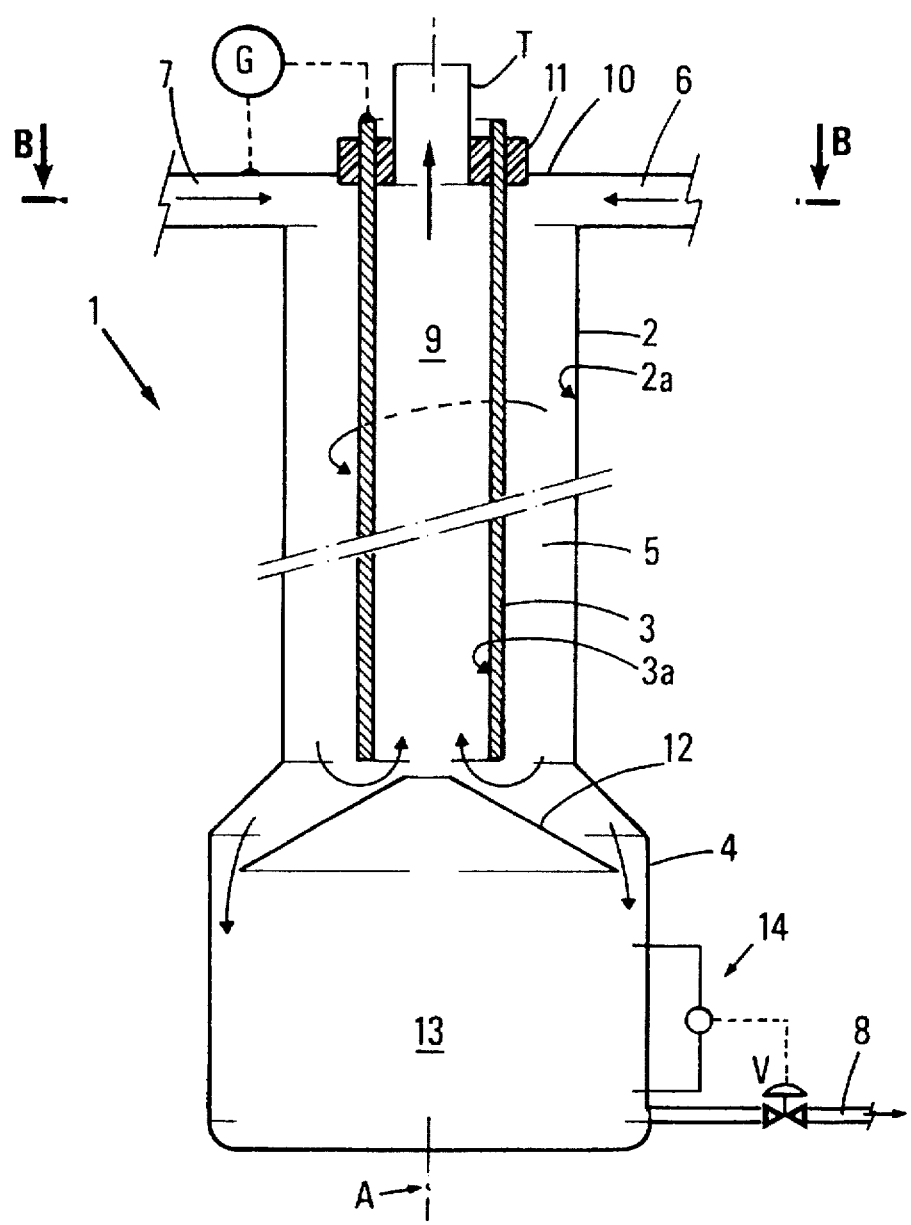
FIGS. 1A and 1B diagrammatically show a separation device according to the invention and a topview of the mixture tangential supply pipes, FIGS. 2A and 2B diagrammatically show a device allowing a finer separation of the mixture to be achieved, FIGS. 3A and 3B schematize embodiments of the device including several annular zones of separation by electrocoalescence and centrifugation, in parallel and in series.
Figure 1B:
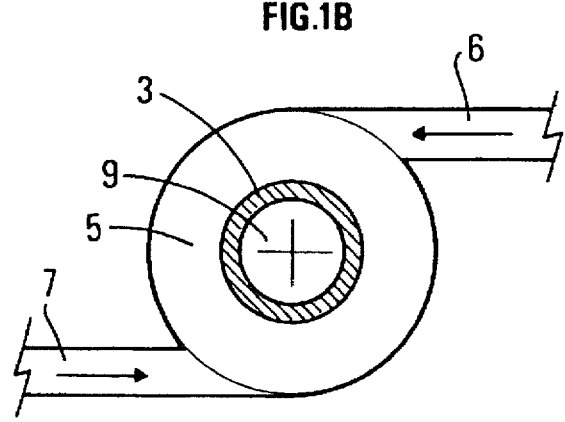

FIG. 1A shows an example of such a device which includes a chamber 1 having an axis A and containing a substantially cylindrical part 2 performing the function of an outer tubular part in which an inner tubular part 3 is arranged, the two parts being preferably coaxial, and a decanting and receiving zone 4 extending the cylindrical zone 2. The length of the inner tubular part 3 is preferably at most equal to the length of the cylindrical zone 2, the cylindrical part 2 of the chamber and the inner tubular part 3 delimiting an annular zone 5 of separation by electrocoalescence and centrifugation. It further includes two pipes 6, 7 (FIG.1B) for introducing the mixture to be separated, arranged tangentially and located in the upper part of the chamber. The chamber also comprises pipes 8, 9 for discharging respectively the phase consisting of drops having coalesced and the continuous phase, the discharge pipe 9 corresponds in this embodiment to the hollow section of the inner part 3.

Chamber 1 is closed in its upper part by a cover 10 in which inner part 3 is fitted. Cover 10 is provided with an opening communicating pipe 9 with an outer discharge tube T. Cover 10 and inner part 3 are insulated electrically by an insulating joint 11.

Chamber 1 and inner part 3 are brought into contact with the terminals of a device such as a high-voltage electric generator G supplied through the mains and piloted by a function generator, allowing the inner part 3 to be brought to a given potential value while chamber 1 is preferably grounded.

In the receiving zone 4 of the chamber, a conical part 12 is arranged to create a zone referred to as a calm zone 13 where an interface between the coalesced disperse phase and the continuous phase may be stabilized by means of a level detector 14 well known to specialists, connected to discharge pipe 8 through a valve V, allowing the rate of flow of the coalesced drops to be controlled in order to maintain the interface between the coalesced drops and the continuous phase at a given distance from the zone where the separation by electrocoalescence and centrifugation is performed. Upon leaving the annular zone, the continuous phase, whose density is lower than that of the disperse phase, is gathered around the central part and passes inside this part through pipe 9 and is thereafter discharged through tube T. During the extraction of the continuous phase through pipe 9, the conical part 12 allows zones of turbulence and of redispersion of the at least partly separated phases to be limited.

The object of device 14 is to maintain the interface level between two given values, one being located for example above pipe 8 and the other, below the zone where the separation by electrocoalescence and centrifugation is performed.

In case the mixture consists of a strongly conducting brine, the inner part 3, performing the function of an electrode brought to a high voltage value, is covered with a layer of insulating polymer through methods known to the man skilled in the art. The choice of the insulating material and of its thickness is well known to specialists and depends on the mixture to be separated.

This embodiment allows breakdown phenomena resulting notably from local short circuits when the value of the electric field is raised to be avoided.

The potential difference applied between the inner part and the chamber defends on the individual case.

A continuous electromotive force (emf) is applied between two parts delimiting an annular zone when a mixture is to be separated in which the conducting disperse phase has the form of a little concentrated emulsion within a little conducting continuous phase.

In order to separate mixtures consisting of relatively concentrated emulsions, it is more advantageous to use variable voltage sources generating an alternating voltage or a pulsed or impulsive electromotive force, constantly of equal sign, for example.

The frequency value and the intensity of the electromotive force used is selected according to the nature of the mixture to be separated and to the type of parts performing the function of electrodes in the device.

The frequency values range for example between 0.1 and 100 Hz, preferably between 50 and 60 Hz. In order to improve the separation, it is possible to use a frequency higher than 100 Hz but less than 1000 Hz in order to avoid a redispersion of the coalesced drops. The intensity of the electric field ranges for example between $3.10^4$ and $6.10^5$ V/m.

The average circulation velocity of the mixture is choosen to obtain a centrifugal force allowing the coalesced drops to be separated from the original mixture, the value of this velocity in an annular zone ranging preferably between 1 and 10 m/s. A centrifugal acceleration ranging for example between 10 g and 500 g is obtained thereby, g being the gravitational acceleration.

The residence time of the mixture in the chamber depends on the desired degree of separation of the mixture and on the stability of the mixture to be separated. It ranges for example between several ten seconds and several minutes.

One possibility of use of the device according to the invention consists in introducing the mixture to be separated, containing the continuous phase and the disperse conducting phase in the form of drops, through pipes 6, 7, the density of the disperse phase being in this instance higher than the density of the continuous phase. The mixture is introduced at a sufficient speed to communicate thereto a rotational motion promoting the separation of the two phases. A potential difference is applied between the inner part 3 and chamber 1, thus performing the function of electrodes, this tension generating a radial electric field substantially perpendicular to the electrodes in the annular zone 5 of circulation of the mixture to be separated. Under the combined action of the electric field and of the centrifugal force, the disperse phase drops coalesce and agglomerate progressively while the mixture flows through the annular zone. While the mixtures runs, the coalesced disperse phase drops of higher density, more subjected to the centrifugal force resulting from the rotational motion, are displaced towards the periphery of the device, i.e. towards the periphery of chamber 1 where they agglomerate and form for example a film on the inner wall 2a of the chamber of the cylindrical zone 2. The mixture, partly separated when leaving the annular zone, flows thereafter through zone 4 of the chamber. The coalesced drops flow for example in the form of a film along the cylindrical zone 2 under the effect of their own weight and/or through a carry-over effect and they are collected thereafter in the receiving zone 4 of the chamber and discharged through pipe 8.

The continuous phase of lower density is collected in the upper part of receiving zone 4, above conical part 12, and discharged thereafter through pipe 9 and tube T.

FIGS. 2A, 2B, 3A and 3B show variants of the device according to the invention allowing a more advanced separation of the mixture to be obtained.

Figure 2A:
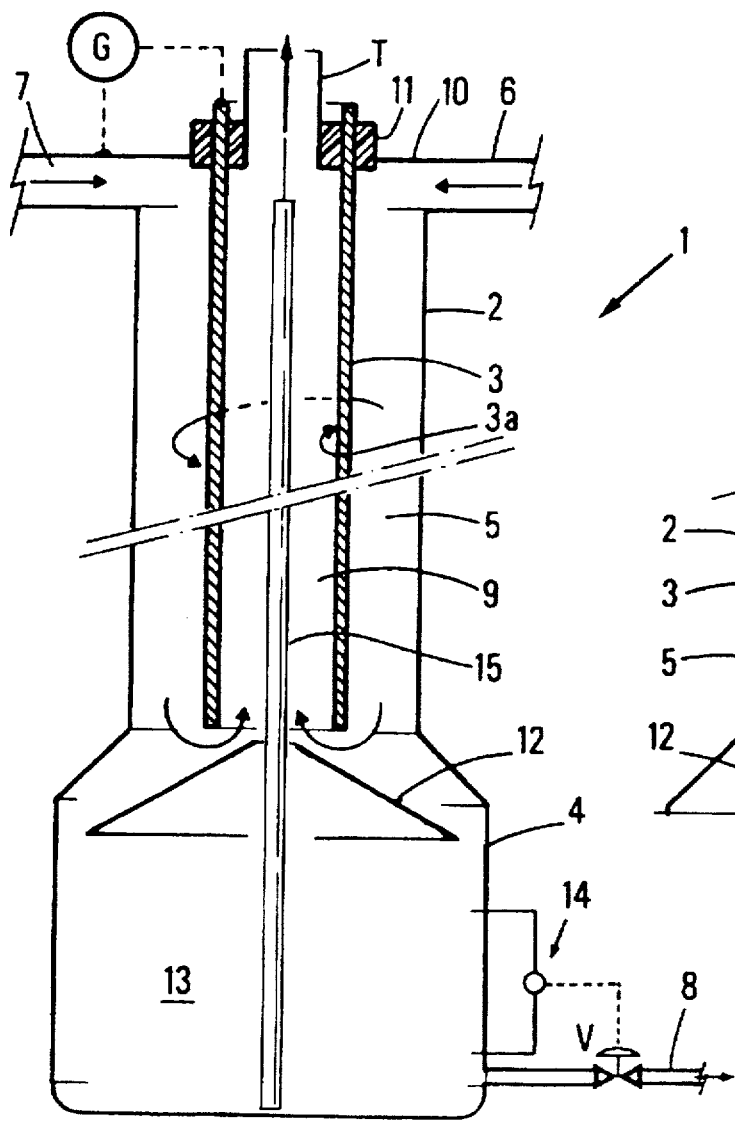
Figure 2B:
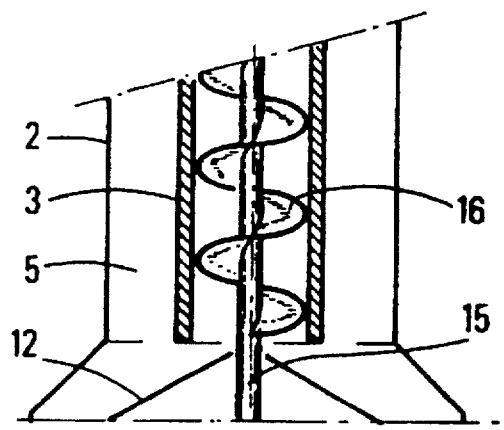

The device shown in FIG. 2A includes a cylindrical electrode 15 arranged coaxially to the inside of the pipe 9 for discharging the continuous phase. This electrode 15 is linked electrically to chamber 1. The intensity of the radial electric field prevailing inside pipe 9 is determined by the inside diameter of tubular part 3 and by the outside diameter of electrode 15. This field allows the disperse phase drops carried over into the continuous phase after the separation stage achieved in the annular zone 5 to coalesce with each other and, under the effect of the centrifugal force, to be separated from the continuous phase by migration towards the inner wall of tubular part 3 on which they form for example a film and flow thereafter downwards towards the bottom of the chamber under the effect of gravity. An advanced separation of the last drops of the conducting disperse phase carried over into the continuous phase at the outlet of the annular zone 5 is obtained thereby.

As the concentration of the disperse phase drops carried over with the continuous phase is lower than that of the drops of the initial mixture, the spacing between electrodes 3 and 15 is preferably less than the distance between the tubular part 3 and chamber 1 so as to have a more intense electric field in pipe 9 than the field in annular zone 5.

In order to facilitate the draining of the drops along the inner wall 3a of tubular part 3, the drops exhibiting a countercurrent flow with respect to the continuous phase discharge, the inner wall 3a of the electrode may be grooved. It may thus comprise vertical grooves or be covered with hydrophilic fibers or with a grid performing the same function as the grooves; these various examples are not shown in the figure. A zone of limited shear is obtained thereby, which allows the film formed by the coalesced drops to flow while minimizing redispersion risks.

Pipe 9 may include a non conducting helical part 16 (FIG.2B) allowing the rotational motion of the mixture as leaves annular zone 5 and enters pipe 9 to be enhanced. This part is for example positioned from the lower end of pipe 9, and its length may be equal to part of the length of the pipe or to the total length thereof.

In the variant shown in FIG. 3A, a finer separation is achieved by passing the mixture through several coaxial annular zones.

Chamber 1 includes three coaxial annular zones or spaces 5, 17 and 18 delimited respectively by the cylindrical part 2 of chamber 1 and by a concentric inner part 19 performing the function of an electrode, by electrode 19 and by the tubular part 3, and by tubular part 3 and a cylindrical central electrode 20 located inside discharge pipe 9 and insulated from chamber 1 by an insulating part 21, preventing thereby short circuits between electrode 20 and the cylindrical part 2 of the chamber. Electrodes 19, 20 are electrically connected together and linked to the high-voltage terminal of generator G while the tubular part 3 and chamber 1 are connected to the other generator terminal. Two adjacent electrodes are brought thereby to a different electric potential so as to generate a substantially radial electric field in the annular zones 5, 17 and 18. Electrode 19 is linked electrically to chamber 1 by parts 22 such as positioning strips, this connection also allowing electrode 19 to be held up in chamber 1. The mixture to be separated is introduced as in the embodiments described above through the tangential pipes 6, 7 and enters a distribution zone 23 located in the upper zone of chamber 1 from which the mixture is distributed in the annular zones 5 and 17 and runs in a rotational motion on account of its tangential delivery into the chamber. Similarly to the previous examples, the drops which have coalesced in zones 5 and 17 are discharged at least partly through pipe 8, while the mixture consisting mainly of the continuous phase from zones 5 and 17 passes into the annular zone 18 where it undergoes a final separation stage through the combined action of the centrifugal force and of the electric field prevailing in this zone. The last drops coalesce and run along the inner wall of part 3 before they are discharged through pipe 8. The continuous phase is discharged through pipe 9 on account of its density which is lower than that of the mixture present in the annular zone 5.

The rotational motion may be enhanced by setting a helical part, identical to part 16 shown in FIG. 2A, inside pipe 9, around electrode 20.

The spacing between the electrodes is choosen according to the concentration of the disperse phase drops in the mixture to be separated or in the partly separated continuous phase. The spacing between electrodes 3 and 20 is therefore shorter than that between electrodes 2 and 19 or between electrodes 3 and 19.

This embodiment using the parallel feed of several annular zones allows the intensity of the electric field in the various annular zones to be varied, the electric and hydrodynamic conditions being equal.

In the embodiment of FIG. 3B, the chamber includes several annular zones so arranged that the outlet of an annular zone communicates with the inlet of the next annular zone. The mixture runs therefore through the zones in series, one after the other.

The device comprises a concentric cylindrical inner part 24 connected to the upper cover 10 of chamber 1 and delimiting therewith a first annular zone 25, a second part having the shape of a cylindrical tube closed at the lower end thereof 26, located inside part 24 and concentric thereto, forming a second annular zone 27 with part 24, the outlet of the annular zone 25 communicating with the inlet of zone 27. The tubular part 3 located inside tube 26 forms a third annular zone 28 positioned after zone 27 and, finally, a central electrode 29 located inside tubular part 3 and connected to the lower end of tube 26 delimits a fourth annular zone 30 positioned after zone 28. The lower end of tube 26 opens into chamber 1 so as to form a zone of discharge of the coalesced drops. It is provided with a device 31 for detecting the interface level, identical to device 14, connected to a flow-control valve V described in FIG. 1A and located on a discharge pipe 32.

The cylindrical parts 3 and 24 are connected to the high-voltage terminal of generator G, whereas chamber 1 and parts 26, 29 are connected to the other terminal of the generator so as to create in the annular zones 25, 27, 28 and 30 an electric field promoting the coalescence of the disperse phase drops.

The mixture to be separated introduced through the tangential pipes 6, 7 runs through zones 25, 27, 28 and 30 in series. As it flows through the various annular zones, the combined effect of the electric fields and of the centrifugal force leads to the coalescence of the disperse phase drops and to the increasingly finer separation of the coalesced drops from the continuous phase. The disperse phase drops coalesce and migrate towards the periphery of the annular zones, and run thereafter along the walls of the parts delimiting these annular zones, for example in the form of a film, towards the lower end of chamber 1 where they are discharged through pipes 8 and 32.

This embodiment is more particularly suited for industrial desalting operations conducted in several steps going from a coarse separation to a finer separation. Zones 25 and 27 are called coarse separation zones, the coalesced salt-saturated drops are discharged through pipe 8. The continuous phase containing drops from the disperse phase which have not coalesced, or insufficiently to be separated, passes into zone 28 where it is mixed again with little salted dilution water introduced tangentially through delivery pipe 33. The new mixture formed thereby passes then into annular zones 28 and 30 where it is progressively separated and thus desalted. The drops which have coalesced in zones 28 and 30 are collected in the lower part of tube 26 and discharged through pipe 32.

The flow rates of the pipes 8 and 32 for discharging the coalesced drops are preferably subjected to a level control by means of the devices 14, 31 known to specialists.

Figure 4A:
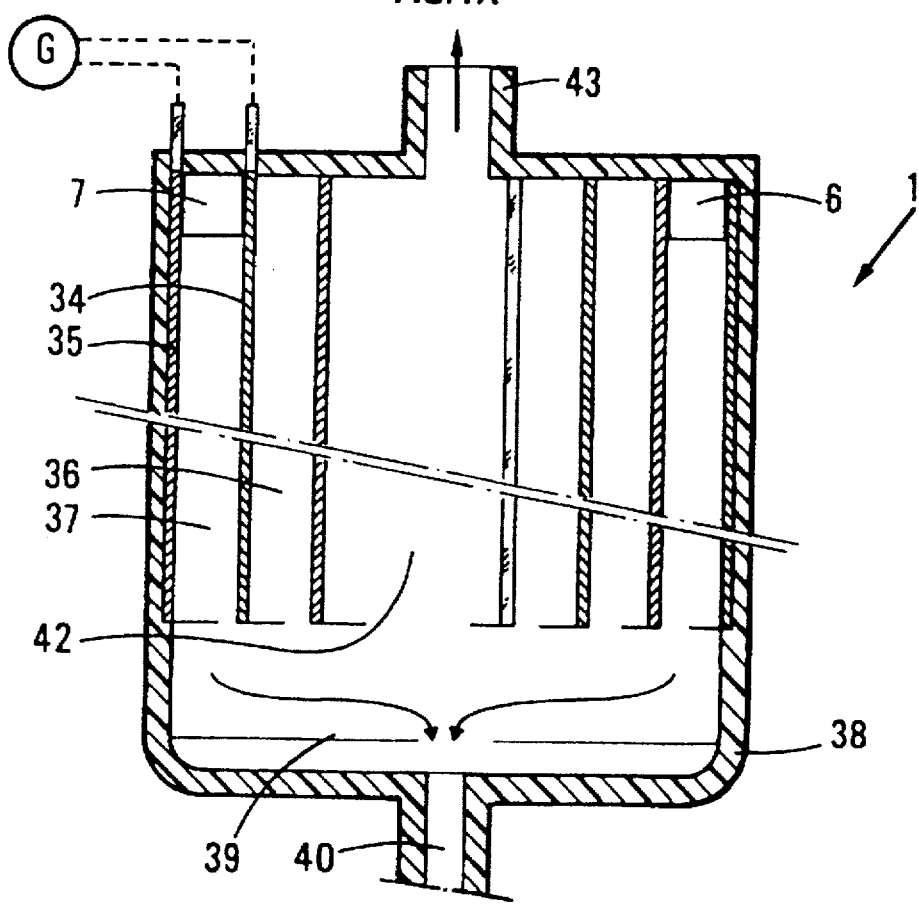
FIGS. 4A and 4B show a variant of the device including spiral-shaped annular separation zones, FIG. 5 schematizes a device including a hydrocyclonic separation zone setted after the zone of separation by electrocoalescence and centrifugation.
Figure 4B:
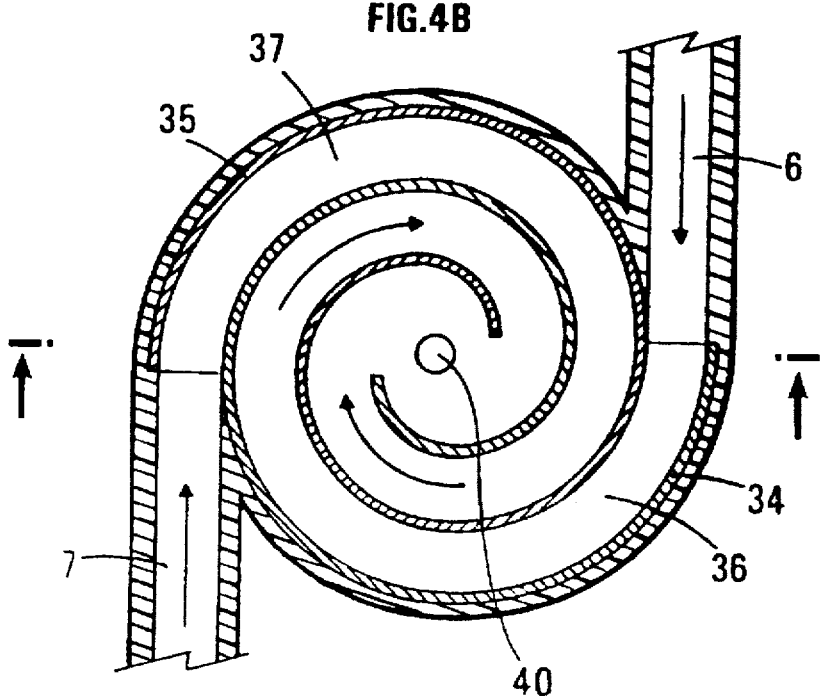

The device shown in FIG. 4A comprises two spiral-shaped inner parts performing the function of electrodes 34, 35 fitted into one another and coaxial to insulating chamber 38. The two parts are brought to a different electric potential and delimit thereby two annular zones 36, 37 (FIG. 4B) in which a radial electric field of equal intensity prevails. The winding of these parts is so achieved that electrodes 34, 35 are not in contact.

The mixture to be separated is introduced tangentially to the chamber through pipes 6, 7 which open respectively into the annular zones 36, 37. The winding of the parts and the tangential introduction of the mixture gives the mixture a high rotational speed. Under the combined effect of the electric field and of the centrifugal force, the disperse phase drops tend to coalesce and to migrate towards the periphery of the annular zones, the inner wall of electrode 34 for zone 36 and the inner wall of electrode 35 for zone 37. The coalesced drops form for example a film on the surface of the electrodes which is driven by gravity towards the lower end of chamber 1 in zone 39, the film being thereafter discharged through a pipe 40 located at the lower end of chamber 1. The part of the continuous phase depleted in disperse phase on account of the centrifugal effect runs through the annular zones 36, 37, then through zone 42 delimited by parts 34 and 35, and is finally discharged through pipe 43 located in the upper central part of the chamber.

This type of configuration promotes the continuous draining of the coalesced particles towards zone 39 called a "calm zone" and thereby reduces the risks of re-entrainment of the coalesced drops with the continuous phase.

Figure 5:
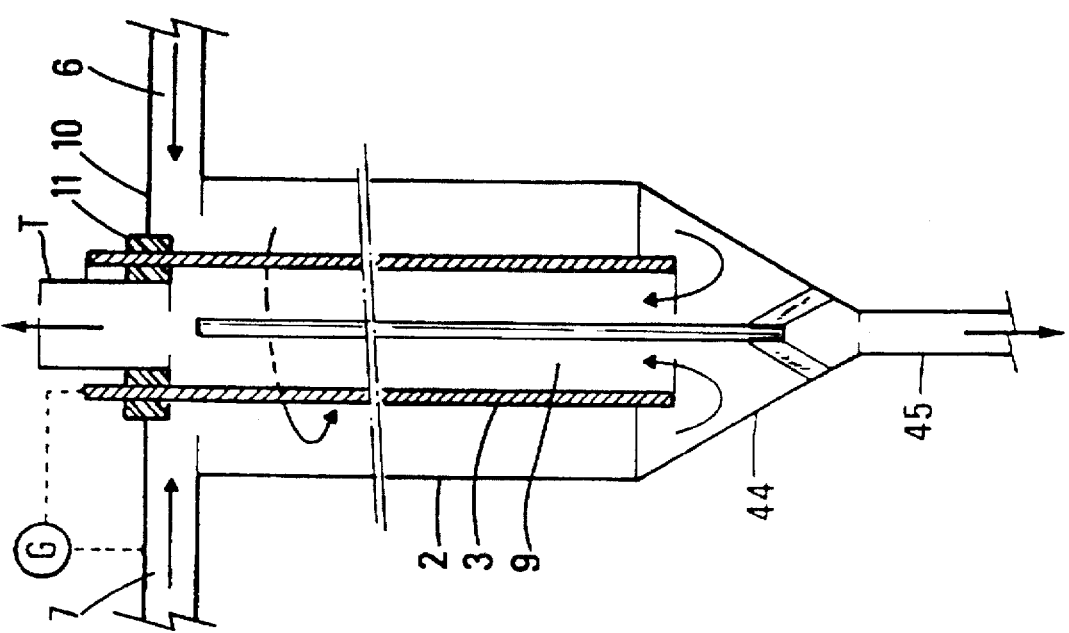

In the embodiment of FIG. 5, the discharge of the phases partly separated after passing through an annular zone is performed more efficiently by means of a hydrocyclonic centrifugal effect.

The zone 4 of chamber 1 in FIG. 1 is replaced by a conical-shaped part 44 prolonged by a discharge pipe 45. The conical shape of part 44 allows the mixture situated in this zone, mainly consisting of coalesced drops, to keep its rotational motion until it is extracted through pipe 45. The proportions of part 44 are identical or similar for example to those of the hydrocyclones known to specialists.

Figure 6:
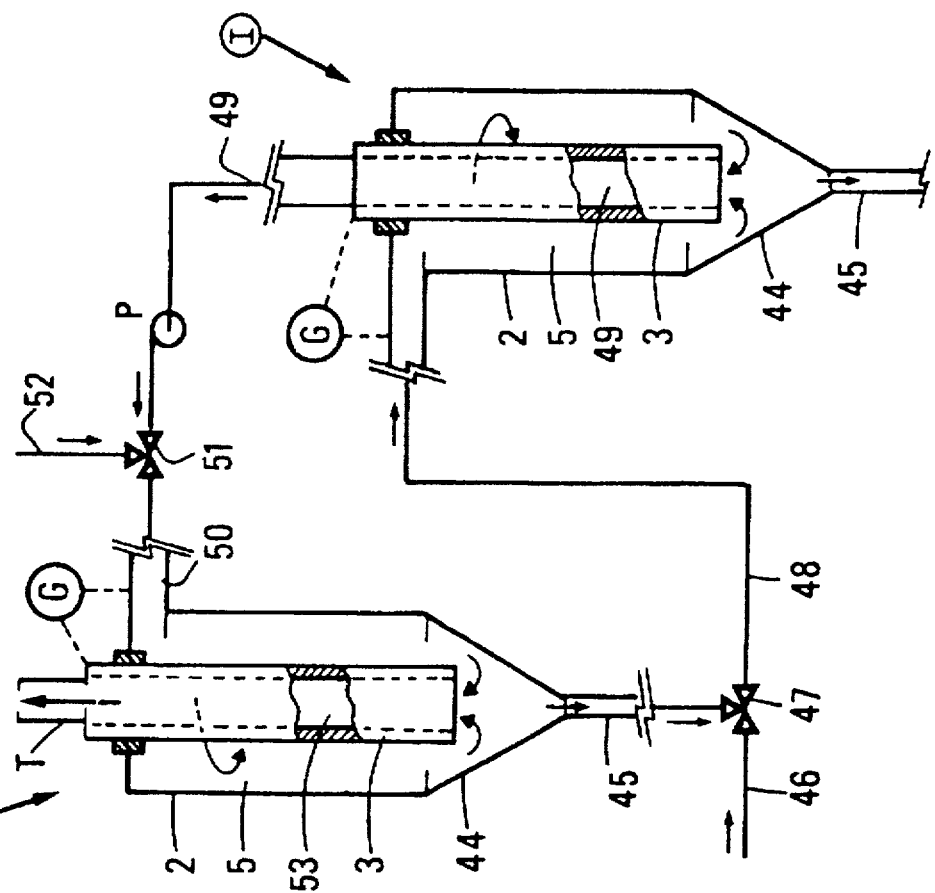
FIG. 6 shows a separation device consisting of two separation elements, FIG. 7A schematizes a possible mode of combination of several devices according to the invention.

FIG. 6 shows an embodiment of the device according to the invention which combines in series two devices I and II, such as those shown in FIG. 5, more particularly suited for the two-step separation of a mixture.

The desalting of a "crude" or petroleum effluent consisting of a continuous phase such as oil and of an aqueous phase in the dispersed form of drops may be achieved thereby. Devices I and II are connected to each other by lines and valves described hereunder.

The crude to be separated is introduced through pipe 46 and may be mixed with water coming for example from device II by means of a mixing valve 47. The new water-crude mixture enters device I tangentially through pipe 48 where it is separated at least partly, the salt-saturated drops which have coalesced being discharged through pipe 45 located in the hydrocyclonic part of the device and the continuous phase being discharged through a pipe 49 corresponding to the inside of the tubular part 3 and connected to the delivery pipe 50 of device II. The continuous phase still containing drops which have not or insufficiently coalesced in device I passes into the second device II through a pipe 50 fitted with a mixing valve 51. It is thereafter mixed with water coming from a source of water with a very low salt content, not shown in the figure, through a pipe 52 and valve 51. This water supply allows the dissolved salts to be diluted. The new mixture enters device II in order to achieve the separation of the residual drops and of the new water drops coming from the source. The separation is performed identically to the embodiments described above. The continuous phase is discharged through the pipe 53 corresponding to the hollow portion of tubular part 3 and the coalesced drops are discharged through pipe 45.

In a preferred embodiment, the operation of the separators is so adjusted that the electric field is lower in the first device I than in the second because of the higher concentration and of the greater diameter of the disperse phase drops in the mixture to be separated, and that the draw-off ratio is low enough to limit the carry-over of the oil in the aqueous phase discharge pipe. The value of the electric field intensity prevailing in the annular zone 5 of device II is higher than that of device I because of the concentration and the smaller diameter of the disperse phase drops, the mixture or brine being less salted. The draw-off ratio in this device must be high enough to prevent the carry-over of the aqueous phase by the continuous phase discharged through pipe 53.

In case the pressure of the mixture introduced in the device I is too low, a pump P located on pipe 50 is necessary to supply a sufficient injection rate of the mixture in device II.

In case the water-rich phase extracted from device II through pipe 45 is recirculated towards the feed point of device I, the pump P is used for equalizing the pressure of the mixture from the pipe 45 of device II with the pressure of the mixture circulating in pipe 46.

FIGS. 7A, 7B and 7C show an example of a parallel association of several devices described previously, adapted to industrial treating capacities. FIG.7A shows the lay-out of the separators arranged in vertical bundles comprising 8 elements (FIGS. 7B, 7C) fed by central pipe 54. This pipe opens into a dispatcher 55 for introducing identically and tangentially the mixture to be separated into each of the annular zones 5 of the separator elements. The oil or continuous phase is discharged through vertical pipes 9 which join in a shunt 56. The aqueous phase consisting mainly of the coalesced particles is discharged through pipes 57 and 58 while the level is controlled by means of a device 59 identical to devices 14 and connected in the same way to a valve V (FIG. 1A).

Without departing from the scope of the invention, the tubular inner part 3 may be replaced by a solid part performing the same function. The continuous phase is then discharged through a pipe arranged in the receiving zone and located above the pipe 8 for discharging the drops of the phase which have coalesced.

Part 3 may be brought into rotation with respect to chamber 1. The advantage of this rotational motion is to enhance the rotational motion of the mixture in the zone formed by pipe 9 and to increase the centrifugal force in annular zone 5. The direction of rotation of part 3 with respect to chamber 1 is identical to the direction of delivery of the mixture and to the direction of the motion it follows in zone 5.

In order to improve the separation and to obtain a more advanced separation of the mixture, also called a secondary separation, various techniques known to the man skilled in the art may be used, such as the interception of the drops, the adsorption of these drops on a hydrophilic porous material, . . .

Of course, the process and the device which have been described by way of non limitative examples may be provided with various modifications and/or additions by the man skilled in the art without departing from the scope of the invention.

We claim:

1. A process for separating a fluid mixture containing at least a continuous phase (I) and of at least a conducting dispersed phase (II) comprising particles, the two phases having different densities and comprising liquid drops dispersed within the continuous phase, wherein the mixture to be separated is introduced into a device having at least one annular zone delimited by two substantially cylindrical parts, one part being fitted into another part, and said mixture being introduced along a periphery of the one part to produce a rotational motion of the mixture in the annular zone around the one part and to impart a centrifugal force to the mixture, simultaneously a potential difference is applied between said two substantially cylindrical parts to create a radial electric field in the annular zone for causing the particles of the dispersed phase (II) to coalesce and to at least partially separate from the continuous phase due to the centrifugal force in the annular zone, the centrifugal force causing separation of the coalesced particles of the dispersed phase at least partially inside the annular zone, and the continuous phase and the dispersed phase being collected separately outside of the annular zone.

2. A process according to claim 1, wherein the mixture is introduced tangentially to a periphery of at least one of the substantially cylindrical parts.

3. A process as claimed in claim 1, wherein the mixture to be separated is circulated in a plurality of annular zones, each annular zone being located between coaxially arranged tubular parts to promote separation of the continuous and dispersed phases; a potential difference being applied to each annular zone to create a radial electric field therein for promoting coalescence of the particles.

4. A process according to claim 3, wherein the mixture is injected simultaneously into the plurality of annular zones.

5. A process according to claim 3, wherein the mixture is circulated successively in a series of the annular zones.

6. A process according to claim 3, wherein the mixture to be separated is circulated in a first annular zone, delimited by an outer tubular part and an inner tubular part, said tubular parts being substantially coaxial, in the first annular zone the mixture undergoes a first separation during which particles which have partly coalesced agglomerate towards a periphery of the outer tubular part, the partly separated continuous phase then passes into a second annular zone delimited by the inner tubular part which comprises a central electrode, in an opposite direction to a direction of circulation of the mixture in the first annular zone, the remaining dispersed particles coalescing during the circulation of said partly separated continuous phase in the second annular zone to agglomerate on an inner wall of the inner tubular part, and the particles coalesced on the inner walls of the outer tubular part and of the inner tubular part, respectively, being drained as liquid towards a lower portion of the device while the continuous phase separated from the dispersed phase is discharged though a pipe located at an upper portion of the device.

7. A process according to claim 1, comprising several separation steps conducted in series, each of these steps allowing a fraction of the disperse phase (II) in the form of liquid drops in the mixture to be separated.

8. A process according to claim 1, wherein a continuous potential difference is applied between the parts delimiting the annular zone so as to generate the electric field.

9. A process according to claim 1, wherein an alternating potential difference is applied between the parts delimiting annular zone so as to generate the electric field.

10. A process according to claim 1, wherein a periodic-varying potential difference of constant sign is applied between the parts delimiting the annular zone.

11. A process according to claim 1, wherein the peak or maximum value of the electric field established within the annular zone ranges between $3.10^4$ and $6.10^5$ V/m.

12. A process according to claim 1, wherein an average velocity of flow of the mixture in the annular zone ranges between 1 and 10 m/s.

13. A process according to claim 1, wherein the dispersed phase particles which have partly coalesced and leave the annular zone are further separated from the continuous phase by static centrifugation in another annular zone.

14. A process accordinq to claim 1, for the separation of a petroleum effluent wherein said mixture comprises the petroleum effluent containing an aqueous phase as the dispersed phase within a petroleum containing continuous phase.

15. A process according to claim 14, for effecting the desalting of crude oil, wherein said mixture comprises an admixture containing relatively little salt water.

* * * * *